United States Patent
Isshiki et al.

(10) Patent No.: US 12,202,468 B2
(45) Date of Patent: Jan. 21, 2025

(54) STEERING CONTROL DEVICE AND STEERING DEVICE

(71) Applicant: Hitachi Astemo, Ltd., Hitachinaka (JP)

(72) Inventors: Ken Isshiki, Hitachinaka (JP); Kyoichi Tagami, Hitachinaka (JP)

(73) Assignee: Hitachi Astemo, Ltd., Hitachinaka-shi (JP)

( * ) Notice: Subject to any disclaimer, the term of this patent is extended or adjusted under 35 U.S.C. 154(b) by 259 days.

(21) Appl. No.: 17/837,296

(22) Filed: Jun. 10, 2022

(65) Prior Publication Data

US 2022/0297672 A1   Sep. 22, 2022

Related U.S. Application Data

(63) Continuation of application No. PCT/JP2020/001926, filed on Jan. 21, 2020.

(30) Foreign Application Priority Data

Jan. 21, 2020   (JP) ................. 2020-007260

(51) Int. Cl.
*B60W 10/20* (2006.01)
*B60W 10/22* (2006.01)
*B60W 30/045* (2012.01)

(52) U.S. Cl.
CPC .......... *B60W 30/045* (2013.01); *B60W 10/20* (2013.01); *B60W 10/22* (2013.01);
(Continued)

(58) Field of Classification Search
CPC .... B60W 30/045; B60W 10/20; B60W 10/22; B60W 2520/14; B60W 2520/18; B60W 2520/20; B60W 2520/28; B60W 2710/20; B60W 2710/226; B62D 6/008; B62D 5/0466; B62D 6/00
(Continued)

(56) References Cited

U.S. PATENT DOCUMENTS

2003/0168275 A1* 9/2003 Sakugawa ............... B62D 6/008
                                                          180/402
2004/0019423 A1* 1/2004 Yasui ................. B60T 8/17636
                                                           701/71
(Continued)

FOREIGN PATENT DOCUMENTS

EP    1967443 A2 *  9/2008  ........... B62D 5/0472
JP    2005088648 A *  4/2005  ............. B60T 8/172
(Continued)

OTHER PUBLICATIONS

JP2014213690.english.translate (Year: 2014).*
(Continued)

*Primary Examiner* — B M M Hannan
(74) *Attorney, Agent, or Firm* — Leason Ellis LLP; Edward J. Ellis; Melvin C. Garner (57) ABSTRACT

A steering control device which calculates a steering control amount for controlling steering of a vehicle includes a basic control amount calculation unit which calculate a basic control amount, and a steering control amount arithmetic unit which calculates the steering control amount with reference to self-aligning torque caused by a motion state amount of the vehicle and the basic control amount.

10 Claims, 4 Drawing Sheets

(52) U.S. Cl.
CPC ..... *B60W 2520/14* (2013.01); *B60W 2520/18* (2013.01); *B60W 2520/20* (2013.01); *B60W 2520/28* (2013.01); *B60W 2710/20* (2013.01); *B60W 2710/226* (2013.01)

(58) Field of Classification Search
USPC .......................................................... 701/446
See application file for complete search history.

(56) References Cited

U.S. PATENT DOCUMENTS

| | | | | |
|---|---|---|---|---|
| 2005/0071061 | A1* | 3/2005 | Kato | B62D 6/006 180/443 |
| 2006/0169523 | A1* | 8/2006 | Yoneda | B62D 6/008 180/421 |
| 2007/0273317 | A1* | 11/2007 | Endo | B62D 5/0466 318/432 |
| 2008/0147275 | A1 | 6/2008 | Okazaki et al. | |
| 2008/0217099 | A1* | 9/2008 | Reungwetwattana | B62D 5/0472 180/446 |
| 2009/0088918 | A1* | 4/2009 | Takenaka | B60T 8/17551 701/31.4 |
| 2009/0240389 | A1* | 9/2009 | Nomura | H02P 6/16 701/41 |
| 2012/0089297 | A1* | 4/2012 | Shimizu | B60W 40/076 701/29.7 |
| 2015/0210318 | A1* | 7/2015 | Takeda | B62D 6/008 701/41 |
| 2015/0329142 | A1* | 11/2015 | Takeda | B62D 6/003 701/41 |
| 2015/0344068 | A1* | 12/2015 | Taniguchi | B62D 15/025 701/41 |
| 2016/0114832 | A1* | 4/2016 | Taniguchi | B62D 6/04 701/41 |
| 2018/0015947 | A1* | 1/2018 | Akatsuka | B62D 6/008 |
| 2019/0233004 | A1* | 8/2019 | Kodera | B62D 3/12 |
| 2019/0359250 | A1 | 11/2019 | Isshiki et al. | |
| 2020/0324812 | A1* | 10/2020 | Matsuo | B62D 5/0463 |
| 2020/0403543 | A1* | 12/2020 | Imamura | B62D 5/0484 |
| 2021/0061041 | A1 | 3/2021 | Tagami et al. | |

FOREIGN PATENT DOCUMENTS

| | | | | |
|---|---|---|---|---|
| JP | 2007069855 A | * | 3/2007 | |
| JP | 2008149887 A | | 7/2008 | |
| JP | 2014213690 A | | 11/2014 | |
| JP | 2017105424 A | * | 6/2017 | .......... B62D 5/0457 |
| JP | 6328841 B1 | * | 5/2018 | .......... B62D 5/0463 |
| JP | 2018161951 A | | 10/2018 | |
| JP | 6553256 B1 | * | 7/2019 | ......... B60G 17/0195 |
| JP | 2020001605 A | | 1/2020 | |
| JP | 6646498 B2 | * | 2/2020 | |
| JP | 2020117025 A | * | 8/2020 | |
| WO | WO-2014073180 A1 | * | 5/2014 | ............ B60T 8/1755 |
| WO | WO-2018173302 A1 | * | 9/2018 | ............ B62D 5/0463 |
| WO | WO-2020003550 A1 | * | 1/2020 | ......... B60G 17/0162 |

OTHER PUBLICATIONS

JP2014213690—Bibliographic data (Year: 2014).*
International Search Report mailed Mar. 24, 2020 for the corresponding PCT International Patent Application No. PCT/JP2020/001926, 7 pages including English translation.
Written Opinion mailed Mar. 24, 2020 for the corresponding PCT International Patent Application No. PCT/JP2020/001926, 4 pages.

* cited by examiner

STEERING CONTROL DEVICE AND STEERING DEVICE

CROSS-REFERENCE TO RELATED APPLICATION

This application is a Continuation of International Application No. PCT/JP2020/001926 filed on Jan. 21, 2020, and claims the benefit of priority to Japanese Patent Application No. 2020-007260 filed on Jan. 21, 2020, the contents of all of which are incorporated herein by reference in their entireties.

FIELD OF THE INVENTION

The present invention relates to a steering control device and a steering device.

BACKGROUND OF THE INVENTION

A steering device which applies an assist torque or a reaction torque to a steering member is known.

Patent Literature 1: JP-A 2018-161951

Here, as a result of further studies, the inventors of the present invention have found that a delay in an input of self-aligning torque due to a motion state amount of a vehicle when a steering torque is input causes torque loss at the time of turning back. As described above, there is room for improvement in a steering device of the related art from the viewpoint of improving stability of turning back by alleviating the torque loss.

An object of the present invention is to realize a steering control device which performs steering control with improved stability of turning back.

SUMMARY OF THE INVENTION

To solve the problems described above, a steering control device according to an aspect of the present invention is a steering control device which calculates a steering control amount for controlling steering of a vehicle, including a basic control amount calculation unit which calculates a basic control amount, and a steering control amount arithmetic unit which calculates the steering control amount with reference to self-aligning torque caused by a motion state amount of the vehicle and the basic control amount.

According to the aspect of the present invention, steering control with improved stability of turning back can be performed.

DETAILED DESCRIPTION OF THE INVENTION

First Embodiment

Hereinafter, a first embodiment of the present invention will be described in detail.

[Configuration of Vehicle]

Figure 1:
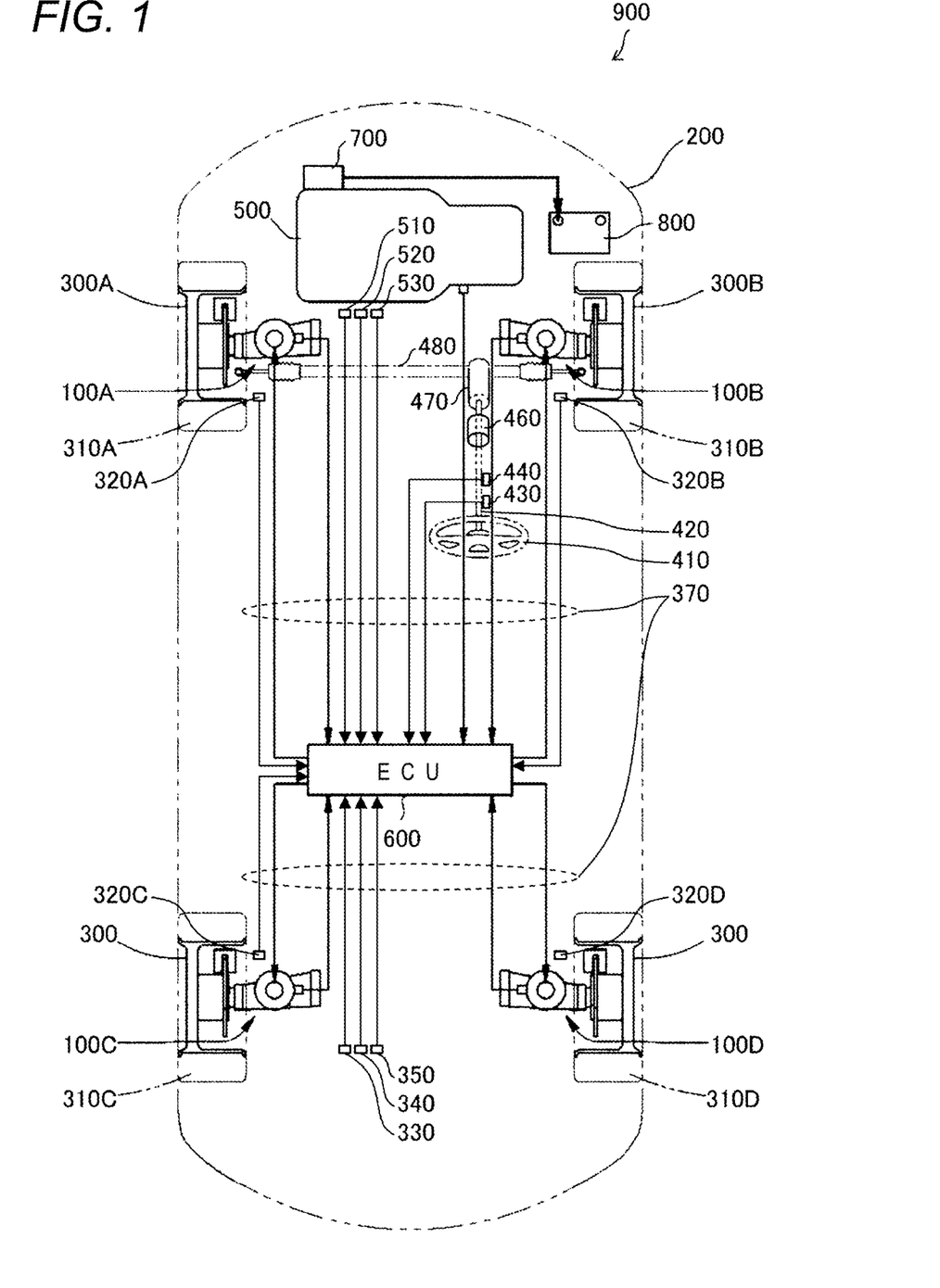
FIG. 1 is a diagram schematically illustrating an example of a vehicle configuration according to a first embodiment of the present invention.

FIG. 1 is a diagram schematically illustrating an example of a configuration of a vehicle 900 according to the present embodiment. As illustrated in FIG. 1, the vehicle 900 includes a suspension device (suspension) 100, a vehicle body 200, a vehicle wheel 300, a tire 310, a steering member 410, a steering shaft 420, a torque sensor 430, a steering angle sensor 440, a torque application unit 460, a rack and pinion mechanism 470, a rack shaft 480, an engine 500, an electronic control unit (ECU) (control device, control unit) 600, an electric power generation device 700, and a battery 800. Here, the suspension device 100 and the ECU 600 form a suspension device according to the present embodiment.

The vehicle wheel 300 on which the tire 310 is mounted is suspended from the vehicle body 200 by the suspension device 100. Since the vehicle 900 is a four-wheeled vehicle, the suspension device 100, the vehicle wheel 300, and the tire 310 are provided on each of the four wheels.

The tires and vehicle wheels of a left front wheel, a right front wheel, a left rear wheel, and a right rear wheel are also referred to as a tire 310A and a vehicle wheel 300A, a tire 310B and a vehicle wheel 300B, a tire 310C and a vehicle wheel 300C, and a tire 310D and a vehicle wheel 300D, respectively. Hereinafter, similarly, the configurations attached to the left front wheel, the right front wheel, the left rear wheel, and the right rear wheel may be represented by adding the reference letters "A", "B", "C", and "D".

The suspension device 100 includes a hydraulic shock absorber (absorber), an upper arm, and a lower arm. Further, as an example, the hydraulic shock absorber includes a solenoid valve which is an electromagnetic valve for adjusting a damping force generated by the hydraulic shock absorber. However, this does not limit the present embodiment, and the hydraulic shock absorber may use an electromagnetic valve other than the solenoid valve as the electromagnetic valve for adjusting the damping force. For example, it may adopt a configuration in which an electromagnetic valve using an electromagnetic fluid (magnetic fluid) is provided as the electromagnetic valve described above.

The electric power generation device 700 is attached to the engine 500, and the electric power generated by the electric power generation device 700 is stored in the battery 800.

The steering member 410 operated by a driver is connected to one end of the steering shaft 420 so as to be able to transmit torque, and the other end of the steering shaft 420 is connected to the rack and pinion mechanism 470.

The rack and pinion mechanism 470 is a mechanism for converting the rotation of the steering shaft 420 around an axis into a displacement along an axis of the rack shaft 480. When the rack shaft 480 is displaced in an axial direction, the vehicle wheel 300A and the vehicle wheel 300B are turned via a tie rod and a knuckle arm.

The torque sensor 430 detects the steering torque applied to the steering shaft 420, in other words, the steering torque applied to the steering member 410, and provides the ECU 600 with a torque sensor signal indicating a detection result. More specifically, the torque sensor 430 detects the twist of a torsion bar built in the steering shaft 420 and outputs a detection result as a torque sensor signal. As the torque sensor 430, a well-known sensor such as a Hall IC, an MR element, or a magnetostrictive torque sensor may be used. The steering angle sensor 440 detects a steering angle of the steering member 410 and provides the ECU 600 with a detection result.

The torque application unit 460 applies an assist torque or a reaction torque according to a steering control amount supplied from the ECU 600 to the steering shaft 420. The torque application unit 460 includes a motor which generates an assist torque or a reaction torque according to the steering control amount, and a torque transmission mechanism which transmits the torque generated by the motor to the steering shaft 420.

In the above description, "connected so as to be able to transmit torque" means that members are connected so that the rotation of one member causes the rotation of the other member. For example, at least the case where one member and the other member are integrally molded, the case where one member is directly or indirectly fixed to the other member, and the case where one member and the other member are connected so as to be interlocked with each other via a joint member or the like are included.

The ECU 600 collectively controls various electronic devices included in the vehicle 900. For example, the ECU 600 controls a magnitude of the assist torque or reaction torque applied to the steering shaft 420 by adjusting the steering control amount supplied to the torque application unit 460.

Further, the ECU 600 controls the opening and closing of a solenoid valve by supplying a suspension control amount to the solenoid valve included in the hydraulic shock absorber included in the suspension device 100. In order to enable this control, an electric power line for supplying drive power from the ECU 600 to the solenoid valve is arranged.

Also, the vehicle 900 includes a vehicle wheel speed sensor 320 which is installed for each vehicle wheel 300 and detects the vehicle wheel speed of each vehicle wheel 300, a lateral G-sensor 330 which detects lateral acceleration of the vehicle 900, a front-rear G-sensor 340 which detects front-rear acceleration of the vehicle 900, a yaw rate sensor 350 which detects a yaw rate of the vehicle 900, an engine torque sensor 510 which detects a torque generated by the engine 500, an engine rotation number sensor 520 which detects the number of rotation of the engine 500, and a brake pressure sensor 530 which detects a pressure applied to a brake fluid of a brake device. Detection results of these various sensors are supplied to the ECU 600.

Although not illustrated, the vehicle 900 includes an antilock brake system (ABS) which is a system to prevent the vehicle wheel from locking during braking, a traction control system (TCS) which suppresses slipping of the vehicle wheel during acceleration or the like, and a vehicle stability assist (VSA) controllable braking device which is a vehicle behavior stabilization control system equipped with an automatic braking function for a yaw moment control or a brake assist function during turning.

Here, the ABS, the TCS, and the VSA compare the vehicle wheel speed determined by the estimated vehicle body speed with the vehicle wheel speed detected by the vehicle wheel speed sensor 320, and then the ABS, the TCS, and the VSA determine that the vehicle is in a slip state when the values of these two vehicle wheel speeds differ by a predetermined value or more. Through such processing, the ABS, the TCS, and the VSA aim to stabilize the behavior of the vehicle 900 by performing optimum brake control or traction control according to a traveling state of the vehicle 900.

Further, the supply of the detection results by the various sensors described above to the ECU 600 and the transmission of the control signal from the ECU 600 to each part are performed via a controller area network (CAN) 370.

The signal supplied to the ECU 600 via the CAN 370 includes, for example, the following signals (parentheses indicate the acquisition source).

Vehicle wheel speeds of four wheels (vehicle wheel speed sensors 320A to 320D)
Yaw rate (yaw rate sensor 350)
Front-rear G (front-rear G sensor 340)
Lateral G (lateral G-sensor 330)
Brake pressure (brake pressure sensor 530)
Engine torque (engine torque sensor 510)
Engine rotation number (engine rotation number sensor 520)
Steering angle (steering angle sensor 440)
Steering torque (torque sensor 430)
Image around vehicle 900 (camera 550)

(Steering Device)

In the following, the configuration of a steering device included in the vehicle 900 will be specifically described by changing the reference drawing.

Figure 2:
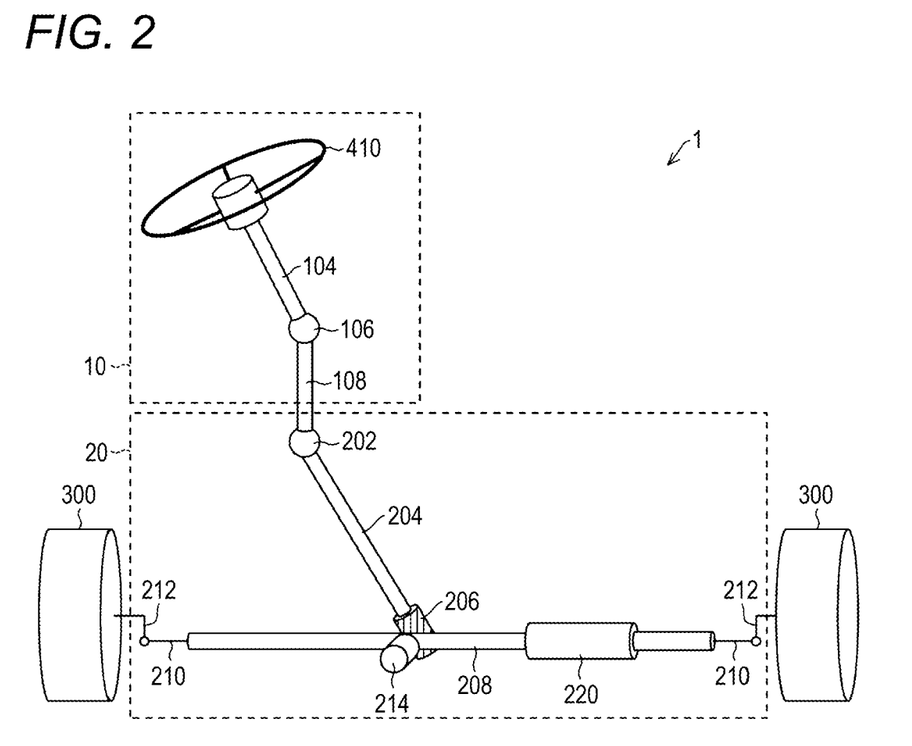
FIG. 2 is a schematic diagram schematically illustrating an example of a main part configuration of a steering device according to the first embodiment of the present invention.

FIG. 2 is a schematic diagram schematically illustrating an example of a main configuration of the steering device according to the first embodiment of the present invention. As illustrated in FIG. 2, a steering device 1 includes a steering unit 10 which receives a steering operation by a driver, a turning unit 20 which turns the vehicle wheel 300 according to the steering operation received by the steering unit 10, and the ECU 600 (not illustrated in FIG. 2).

<Steering Unit 10>

As illustrated in FIG. 2, the steering unit 10 includes the steering member 410, the steering shaft 104, a first universal joint 106, and an intermediate shaft 108, and the steering member 410, the steering shaft 104, and the intermediate shaft 108 are connected to each other so as to be able to transmit torque.

In the present embodiment, an upper end of the steering shaft 104 is fixed to the steering member 410 and rotates integrally with the steering member 410. Further, a lower end of the steering shaft 104 and an upper end of the intermediate shaft 108 are connected to each other via the first universal joint 106 so as to be interlocked with each other.

The "upper end" refers to an upstream end portion (that is, an input side end portion) in a steering force transmission path according to the driver's steering operation, and the "lower end" refers to a downstream end portion (that is, an output side end portion) in the steering force transmission path (the same applies hereinafter).

<Turning Unit 20>

The turning unit 20 is a configuration for turning the vehicle wheel 300 according to the steering operation of the driver received by the steering unit 10.

As illustrated in FIG. 2, the turning unit 20 includes a second universal joint (universal joint) 202, a pinion shaft (input shaft) 204, a pinion gear (first pinion gear) 206, a rack shaft 208, a tie rod 210, a knuckle arm 212, a rack guide mechanism 214, and a turning force generation unit 220. The intermediate shaft 108, the pinion shaft 204, and the pinion gear 206 are connected to each other so as to be able to transmit torque.

In the present embodiment, the pinion gear 206 is fixed to a lower end of the pinion shaft 204 and rotates integrally with the pinion shaft 204. A lower end of the intermediate shaft 108 and an upper end of the pinion shaft 204 are connected to each other via the second universal joint 202 so as to be interlocked with each other.

The rack shaft 208 is configured to turn the vehicle wheel 300 in response to the rotation of the pinion gear 206, and the rack shaft 208 is formed with rack teeth (not illustrated) that mesh with the pinion gear 206.

In the steering device 1 configured as described above, the pinion gear 206 is connected so as to be able to transmit torque to the steering member 410 operated by the driver. Specifically, when the driver performs a steering operation via the steering member 410, the pinion gear 206 rotates and the rack shaft 208 is displaced along an axial direction of the rack shaft 208. As a result, the vehicle wheel 300 is turned via the tie rods 210 provided at both ends of the rack shaft 208 and the knuckle arms 212 connected to the tie rods 210.

The rack guide mechanism 214 is a mechanism for pressing the rack shaft 208 to the pinion gear 206 side.

In the example illustrated in FIG. 2, the configuration in which the steering force is transmitted between the pinion shaft 204 and the rack shaft 208 by the pinion gear 206 and the rack teeth is given as an example, but the present invention is not limited to this embodiment. Other configurations may be used as long as they can transmit the steering force between the pinion shaft 204 and the rack shaft 208.

(ECU 600)

Figure 3:
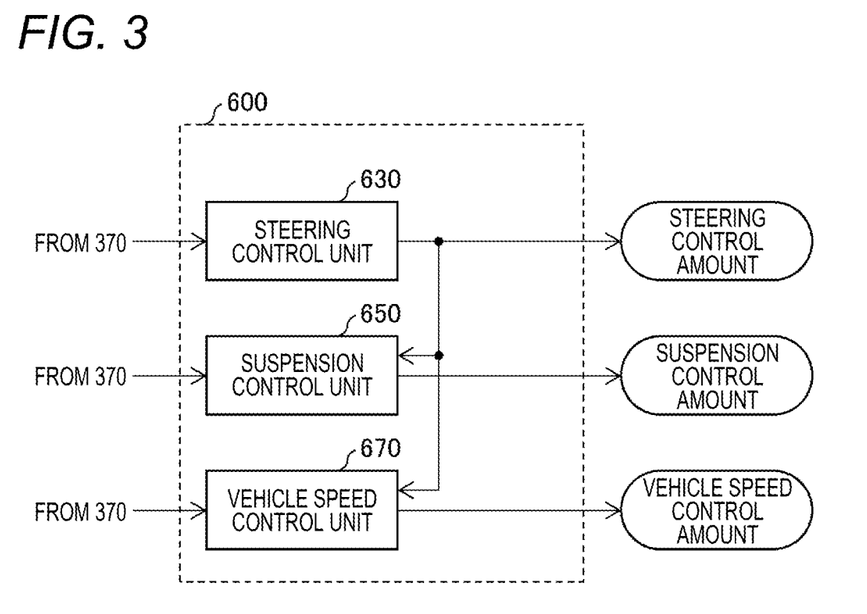
FIG. 3 is a block diagram schematically illustrating an example of a configuration of an ECU according to the first embodiment of the present invention.

In the following, the ECU 600 will be specifically described by changing the reference drawing. FIG. 3 is a diagram illustrating a schematic configuration of the ECU 600.

As illustrated in FIG. 3, the ECU 600 includes a steering control unit 630, a suspension control unit 650, and a vehicle speed control unit 670.

The steering control unit 630 refers to various sensor detection results included in the CAN 370, and sets a steering control amount for the vehicle 900 to travel along a lane. The steering control unit 630 supplies the set steering control amount to the torque application unit 460. Further, the steering control unit 630 supplies the set steering control amount to at least one of the suspension control unit 650 and the vehicle speed control unit 670.

In the present specification, the expression "refer to" may include meanings such as "using", "considering", and "depending on".

The suspension control unit 650 controls the damping force of the suspension. More specifically, the suspension control unit 650 refers to the various sensor detection results included in the CAN 370 and the steering control amount supplied from the steering control unit 630, and determines the magnitude of the suspension control amount supplied to a solenoid valve included in the hydraulic shock absorber included in the suspension device 100.

The vehicle speed control unit 670 refers to various sensor detection results included in the CAN 370 and the steering control amount supplied from the steering control unit 630, and determines the magnitude of a vehicle speed control amount supplied to the engine 500 and a brake device.

The steering control unit 630, the suspension control unit 650, and the vehicle speed control unit 670 may be configured to be realized as separate ECUs. In such a configuration, the control described in the present specification is realized by the steering control unit 630, the suspension control unit 650, and the vehicle speed control unit 670 communicating with each other by using communication means.

(Steering Control Unit)

Figure 4:
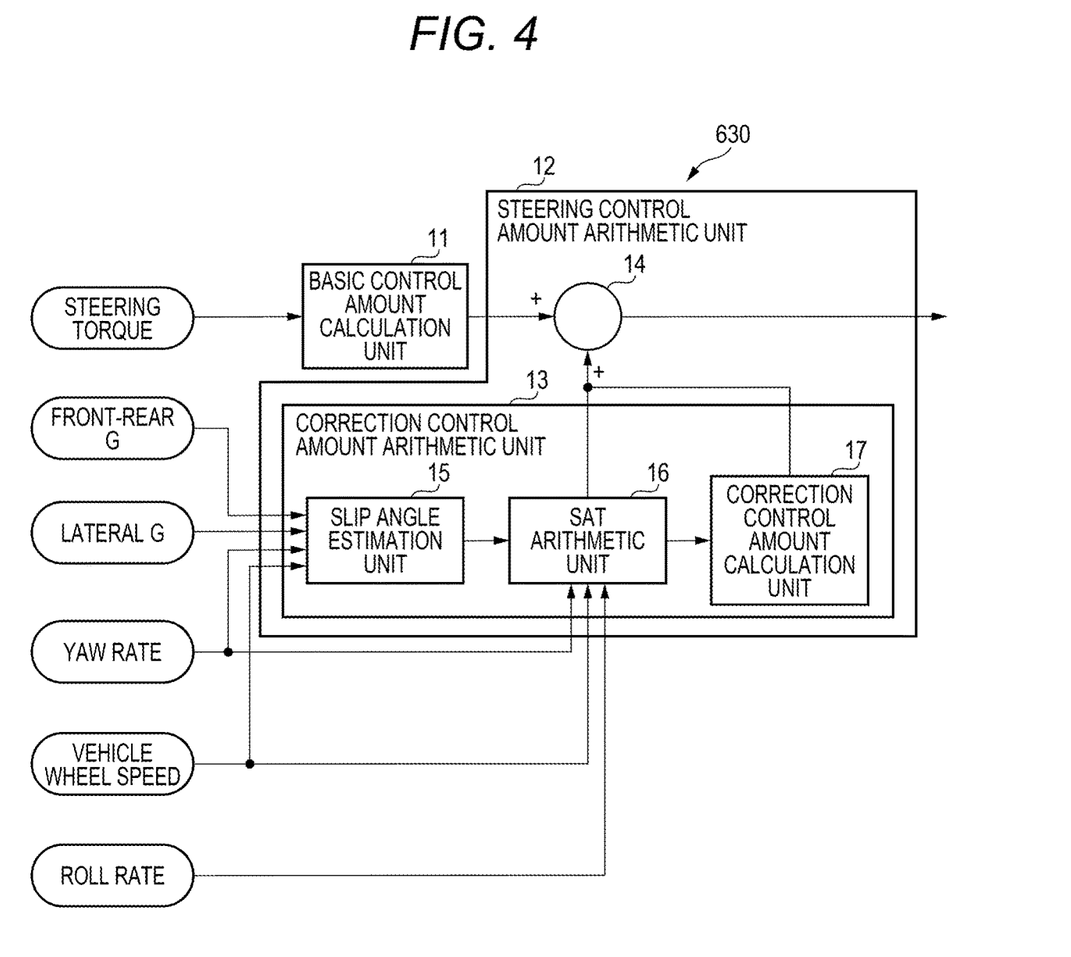
FIG. 4 is a block diagram schematically illustrating an example of a configuration of a steering control unit according to the first embodiment of the present invention.

Subsequently, with reference to FIG. 4, the steering control unit 630 (steering control device in claims) will be described more specifically. FIG. 4 is a block diagram schematically illustrating an example of the configuration of the steering control unit 630. The steering control unit 630 includes a basic control amount calculation unit 11 and a steering control amount arithmetic unit 12.

The basic control amount calculation unit 11 refers to the steering torque (actual torque) supplied from the torque sensor 430, and calculates the basic control amount for controlling the magnitude of the assist torque, the reaction torque, or the steering torque. The basic control amount calculated by the basic control amount calculation unit 11 is supplied to the steering control amount arithmetic unit 12.

The steering control amount arithmetic unit 12 includes a correction control amount arithmetic unit 13 and an addition unit 14. The steering control amount arithmetic unit 12 refers to the basic control amount acquired from the basic control amount calculation unit 11 and self-aligning torque caused by a motion state amount of the vehicle 900, and calculates the steering control amount. A specific calculation method of the self-aligning torque will be described below.

Further, the steering control amount arithmetic unit 12 may be configured to calculate the steering control amount by using a correction control amount calculated by referring to the self-aligning torque instead of the self-aligning torque. The specific calculation method of the correction control amount will be described below.

The correction control amount arithmetic unit 13 includes a slip angle estimation unit 15, a self-aligning torque arithmetic unit (SAT arithmetic unit) 16, and a correction control amount calculation unit 17, and calculates a correction control amount with reference to the self-aligning torque.

The slip angle estimation unit 15 receives a front-rear acceleration $G_x$ of the vehicle 900 from the front-rear G-sensor 340. Further, the slip angle estimation unit 15 receives a lateral acceleration $G_y$ of the vehicle 900 from the lateral G-sensor 330. Further, the slip angle estimation unit 15 receives a yaw rate γ from the yaw rate sensor 350. Further, the slip angle estimation unit 15 receives vehicle wheel speeds V from the γ vehicle wheel speed sensors 320A to 320D. The slip angle estimation unit 15 refers to the supplied front-rear acceleration $G_x$ of the vehicle 900, and the lateral acceleration $G_y$, the yaw rate γ, and the vehicle wheel speed V of the vehicle 900, and calculates a slip angle β (slip angle in claims).

More specifically, the slip angle estimation unit 15 refers to the front-rear acceleration $G_x$, the lateral acceleration $G_y$, the yaw rate γ, and the vehicle wheel speed V of the vehicle 900, and calculates a front-rear speed $V_x$ and a lateral speed $V_y$ of the vehicle 900. The slip angle estimation unit 15 calculates a slip angle β by using the calculated front-rear speed $V_x$ of the vehicle 900 and the lateral speed $V_y$ of the vehicle 900. As a result, the self-aligning torque due to the motion state amount of the vehicle 900 can be suitably calculated, and the steering control with improved stability of turning back can be performed. The slip angle estimation unit 15 supplies the calculated slip angle β to the SAT arithmetic unit 16.

The slip angle β is supplied to the SAT arithmetic unit 16 from the slip angle estimation unit 15. Further, the yaw rate γ is supplied to the SAT arithmetic unit 16 from the yaw rate sensor 350. Further, the vehicle wheel speeds V are supplied to the SAT arithmetic unit 16 from the vehicle wheel speed sensors 320A to 320D. Further, the roll rate is supplied to the SAT arithmetic unit 16 from the suspension control unit 650.

The SAT arithmetic unit 16 refers to the motion state amount of the vehicle 900, and calculates the self-aligning torque caused by the motion state amount of the vehicle 900.

Examples of the motion state amount of the vehicle 900 include the slip angle β, the yaw rate γ, the vehicle wheel speed V, and the roll rate. The SAT arithmetic unit 16 refers to at least one of the slip angle β, the yaw rate γ, and the roll rate, and calculates the self-aligning torque due to the motion state amount of the vehicle 900. The SAT arithmetic unit 16 supplies the self-aligning torque due to the calculated motion state amount of the vehicle 900 to the correction control amount calculation unit 17. Here, the SAT arithmetic unit 16 may be configured to use the roll rate referred to for calculating the suspension control amount in the suspension control unit 650 as the roll rate to be referred to.

The correction control amount calculation unit 17 refers to the self-aligning torque caused by the motion state amount of the vehicle 900 acquired from the SAT arithmetic unit 16, and calculates a correction control amount (correction current) according to the self-aligning torque caused by the motion state amount of the vehicle 900. The correction control amount calculation unit 17 supplies the calculated correction control amount to the addition unit 14.

Here, the suspension control unit 650 estimates the roll rate by time-differentiating the roll angle detected by a roll angle sensor (not illustrated) included in the CAN 370. The present embodiment is not limited to this, and the vehicle 900 may be configured to detect the roll rate by further including a roll rate sensor. Further, the suspension control unit 650 may be configured to calculate the roll rate with reference to the front-rear G and the lateral G.

The roll rate estimated, detected, or calculated by the suspension control unit 650 as described above is referred to in order to calculate the suspension control amount in the suspension control unit 650. Further, as described above, the roll rate may be configured as referenced by the SAT arithmetic unit 16.

The addition unit 14 calculates the steering control amount by adding the basic control amount supplied from the basic control amount calculation unit 11 and the correction control amount calculated by the correction control amount arithmetic unit 13. As a result, the self-aligning torque can be suitably corrected, and steering control with improved stability of turning back can be performed. The addition unit 14 supplies the calculated steering control amount to the torque application unit 460.

Here, a specific process in which "torque loss" occurs is as follows. First, when the driver performs turning, yaw is generated in the vehicle 900, and then a roll is generated. When the roll occurs, the slip angle of the tire 310 changes, and the self-aligning torque changes depending on these motion state amounts of the vehicle 900. As a result, this self-aligning torque may cause a phenomenon of "torque loss" in which a reaction torque smaller than expected by a driver is generated.

By calculating the correction control amount according to the self-aligning torque, the steering control unit 630 according to the present embodiment can eliminate the influence of the self-aligning torque caused by the motion state amount of the vehicle 900, which causes torque loss at the time of turning back. As a result, the steering control unit 630 according to the present embodiment can perform steering control with improved stability of turning back.

In the present embodiment, the correction control amount is calculated from the self-aligning torque caused by the motion state of the vehicle, and the correction control amount is added to the basic control amount by the addition unit, but the present invention is not limited to this method. For example, the gain may be set according to the self-aligning torque caused by the motion state of the vehicle, and the gain may be multiplied by the basic control amount.

(Method of Correcting Steering Control Amount)

The method of correcting the steering control amount in the steering control unit 630 will be described below.

The theoretical equation including the steering torque $T_h$ is expressed as the following equation 1.

[Equation 1]

$$T_h = J_h \ddot{\theta}_h + C_h \dot{\theta}_h + T_{sat} \qquad (1)$$

$T_h$: Steering torque
$J_h$: Steering wheel inertia moment
$\ddot{\theta}_h$ with two dots: Angular acceleration for steering member 410
$C_h$: Steering system viscosity coefficient
$\dot{\theta}_h$ with one dot: Angular velocity for steering member 410
$T_{sat}$: Self-aligning torque Of the above equation 1, the self-aligning torque $T_{sat}$ is expressed as the following equation 2.

[Equation 2]

$$T_{sat} = -2\xi K_f \left( \beta + \frac{l_f \gamma}{V} + \frac{h_f \phi}{V} - \delta \right) \frac{1}{N_s} \qquad (2)$$

ξ: Pneumatic trail
$K_f$: Proportional coefficient determined by tire characteristics
β: Slip angle
$l_f$: Distance from center of gravity of vehicle 900 to wheelbase
γ: Yaw rate
V: Vehicle wheel speed
$h_f$: Distance from roll center to center of gravity of roll
φ with dots: Roll rate
δ: tire turning angle
$N_s$: Steering gear ratio The correction control amount arithmetic unit 13 calculates, among the elements of the above equation 2, a component which changes depending on the motion state amount of the vehicle 900 as a correction control amount $T_{assist}$. More specifically, the element related to the slip angle β, the element related to the yaw rate γ, and the element related to the roll rate are calculated as the correction control amount. The correction control amount $T_{assist}$ is expressed by the following equation 3.

[Equation 3]

$$T'_{sat} = -2\xi K_f \left( \beta + \frac{l_f \gamma}{V} + \frac{h_f \phi}{V} \right) \frac{1}{N_s} = T_{assist} \qquad (3)$$

First, in the slip angle estimation unit 15 of the correction control amount arithmetic unit 13, the slip angle β is calculated with reference to the front-rear acceleration $G_x$, the lateral acceleration $G_y$, the yaw rate γ, and the vehicle wheel speed V.

As an example of the calculation method of the slip angle β, the front-rear speed $V_x$ and the lateral speed $V_y$ are calculated by time-integrating the front-rear acceleration $G_x$ and the lateral acceleration $G_y$, and then the slip angle β is calculated by applying the calculated front-rear speed $V_x$ and lateral speed $V_y$ to the following equation 4.

[Equation 4]

$$\beta = \tan^{-1}\left(\frac{V_y}{V_x}\right) \quad (4)$$

Next, in the SAT arithmetic unit 16 of the correction control amount arithmetic unit 13, the correction control amount $T_{assist}$ of the self-aligning torque is calculated by applying the slip angle β, the yaw rate γ, the vehicle wheel speed V, and roll rate to the above equation 3.

More specifically, the SAT arithmetic unit 16 calculates the correction control amount

[Equation 5]

$$-2\xi K_f \cdot \beta \cdot \frac{1}{N_s}$$

based on the slip angle β with reference to the slip angle β. Further, the SAT arithmetic unit 16 calculates the correction control amount

[Equation 6]

$$-2\xi K_f \cdot \frac{l_f \gamma}{V} \cdot \frac{1}{N_s}$$

based on the yaw rate with reference to the yaw rate γ and the vehicle wheel speed V. Further, the SAT arithmetic unit 16 calculates the correction control amount

[Equation 7]

$$-2\xi K_f \cdot \frac{h_f \phi}{V} \cdot \frac{1}{N_s}$$

based on the roll rate with reference to the roll rate and the vehicle wheel speed V The correction control amount arithmetic unit 13 calculates at least one of these correction control amounts as the correction control amount $T_{assist}$ of the self-aligning torque.

The steering control unit 630 calculates the corrected steering control amount in the addition unit 14 with reference to the steering torque $T_h$ and the correction control amount $T_{assist}$ as in the following equation 5.

[Equation 8]

$$T_h' = T_h - T_{assist} = J_h \ddot{\theta}_h + C_h \dot{\theta}_h + T_{sat} - T_{assist} \quad (8)$$

Second Embodiment

Hereinafter, a second embodiment of the present invention will be described in detail. For convenience of explanation, the same reference numerals are given to members having the same functions as the members described in the embodiment described above, and the description thereof will not be repeated.

In the basic control amount calculation unit 11 according to the present embodiment, the basic control amount for controlling the magnitude of the assist torque, the reaction torque, or the steering torque is calculated with reference to the steering angle supplied from the steering angle sensor 440, instead of the steering torque supplied from the torque sensor 430. The basic control amount calculation unit 11 supplies the basic control amount calculated with reference to the steering angle to the addition unit 14.

The addition unit 14 according to the present embodiment calculates the steering control amount by adding the basic control amount calculated with reference to the steering angle and the correction control amount described above in the first embodiment.

Even with such a configuration, by calculating the correction control amount according to the self-aligning torque, the steering control unit 630 according to the present embodiment can eliminate the influence of the self-aligning torque caused by the motion state amount of the vehicle 900, which causes torque loss at the time of turning back. As a result, the steering control unit 630 according to the present embodiment can perform steering control with improved stability of turning back.

Third Embodiment

Hereinafter, a third embodiment of the present invention will be described in detail by changing the reference drawings. For convenience of explanation, the same reference numerals are given to members having the same functions as the members described in the embodiment described above, and the description thereof will not be repeated.

Figure 5:
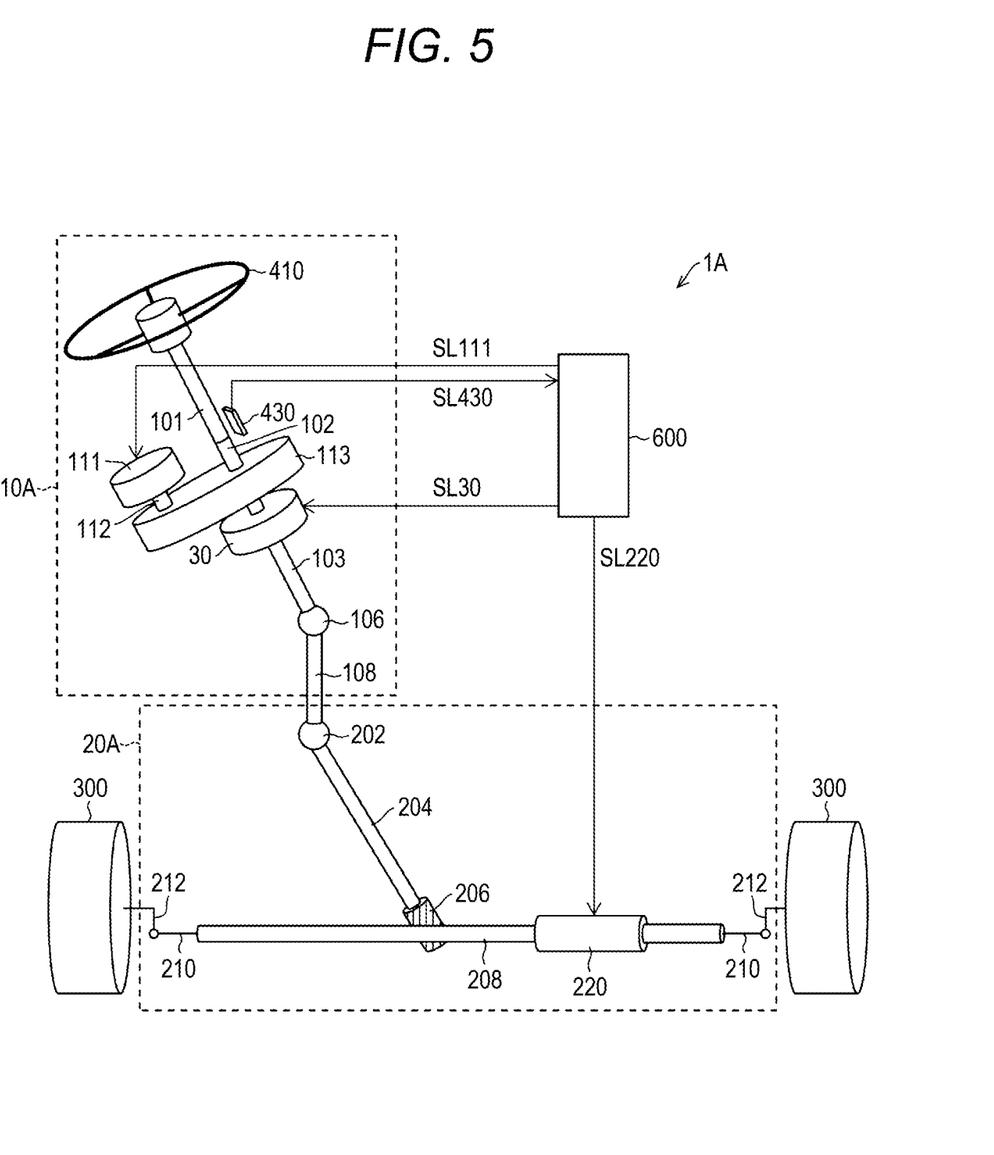
FIG. 5 is a schematic diagram schematically illustrating an example of a main part configuration of a steering device according to a third embodiment of the present invention.

A steering device 1A according to the present embodiment includes a steering unit 10A and a turning unit 20A in place of the steering unit 10 and the turning unit 20 provided in the steering device 1 according to the first embodiment. The steering device 1A is a steer-by-wire type steering device of a vehicle including at least two functions: (1) it is possible to mechanically connect or disconnect a torque transmission path between the steering member 410 and the turning unit 20; and (2) the steering angle of the vehicle wheel 300 can be electrically controlled according to the steering operation via the steering member 410 in a state where the torque transmission path is disconnected.

A vehicle 900 according to the present embodiment has the same configuration as the vehicle 900 according to the first embodiment, except that the steering device is changed to the steer-by-wire type steering device described above, and the configurations of a correction control amount arithmetic unit 13 and a steering control unit 630 according to the present embodiment are respectively the same as the configurations of the correction control amount arithmetic unit 13 and the steering control unit 630 according to the first embodiment.

<Steering Unit 10A>

As illustrated in FIG. 5, the steering unit 10A includes an upper steering shaft 101, a middle steering shaft 102, a lower steering shaft 103, a torque sensor 430, a power generation unit 111, a power transmission shaft 112, a power transmission unit 113, and a clutch 30 in place of the steering shaft 104 in the steering unit 10 according to the first embodiment.

The steering unit 10A has a function of accepting a steering operation by a driver via the steering member 410 and a function of mechanically connecting or disconnecting the torque transmission path between the steering member 410 and the turning unit 20.

In the present embodiment, the "steering shaft" is a shaft arranged on the same axis between the steering member 410 and the first universal joint 106, and refers to the upper steering shaft 101, the middle steering shaft 102, and the lower steering shaft 103 in FIG. 5.

An upper end of the upper steering shaft 101 is connected to the steering member 410 so as to be able to transmit torque. An upper end of the upper steering shaft 101 is fixed to the steering member 410, and the steering member 410 and the upper steering shaft 101 rotate integrally.

The upper steering shaft 101 and the middle steering shaft 102 are elastically connected to each other so that torque can be transmitted, and the twist generated between the upper steering shaft 101 and the middle steering shaft 102 is detected by the torque sensor 430. More specifically, the torque sensor 430 detects a twist angle θT generated according to the magnitude of torque T of the steering operation, and supplies a torque sensor signal SL430 indicating the detection result to the ECU 600. The steering unit 10A may be configured to supply a signal indicating the steering angle or steering angular velocity detected by the steering angle sensor 440 to the ECU 600.

A power transmission unit 113 is connected to the middle steering shaft 102 so as to be able to transmit torque to the middle steering shaft 102. A lower end of the middle steering shaft 102 is connected to the clutch 30.

The power generation unit 111 applies torque to the power transmission shaft 112 according to a torque control signal SL111 supplied from the ECU 600.

The power generation unit 111 is, for example, a motor body, and the power transmission shaft 112 is, for example, a motor output shaft which penetrates into the motor body and is rotationally driven by the motor body. The power transmission shaft 112 may be another shaft connected so as to be able to transmit torque to the motor output shaft.

The power transmission unit 113 is connected to the power transmission shaft 112 so as to be able to transmit torque to the power transmission shaft 112.

The power transmission unit 113 is a power transmission mechanism for transmitting torque between the power transmission shaft 112 and the middle steering shaft 102, and for example, a power transmission mechanism such as a gear drive type, a belt drive type, a chain drive type, a friction drive type, and a traction drive type, or a combination of these power transmission mechanisms can be used. As the gear drive type, a helical gear type, a planetary gear type, and a worm gear and worm wheel type can be used. Further, in the friction drive type or the traction drive type, a type using a planetary roller can be used. Further, the power transmission unit 113 does not have to have a speed reducer.

The torque generated by the power generation unit 111 is transmitted to the middle steering shaft 102 via the power transmission shaft 112 and the power transmission unit 113.

Further, when a general-purpose electric motor is used as the power generation unit 111, the manufacturing cost can be further suppressed.

The clutch 30 is configured to switch whether to mechanically connect or disconnect the torque transmission path between the steering member 410 and the turning unit 20 according to a clutch control signal SL30 supplied from the ECU 600. More specifically, the clutch 30 switches whether to mechanically connect or disconnect the torque transmission between the lower end of the middle steering shaft 102 and an upper end of the lower steering shaft 103 according to the clutch control signal SL30.

The position where the clutch 30 is provided is not limited to that illustrated in FIG. 5. For example, the clutch 30 may be provided in the vicinity (for example, the upstream side of the pinion gear 206 in the pinion shaft 204) of the rack shaft 208 described below.

<ECU 600>

The ECU 600 controls the turning force generated by the turning force generation unit 220 and the torque generated by the power generation unit 111 in response to the steering operation by the driver.

More specifically, the ECU 600 refers to the torque sensor signal SL430 supplied from the torque sensor 430 to generate the torque control signal SL111 for controlling the torque generated by the power generation unit 111 and a turning force control signal SL220 for controlling the turning force generated by the turning force generation unit 220, and supplies the signals to the power generation unit 111 and the turning force generation unit 220, respectively.

The ECU 600 may be configured to generate the torque control signal SL111 and the turning force control signal SL220 by further referring to a signal indicating the steering angle of the steering member 410, a vehicle speed signal from a vehicle speed sensor, and the like. Further, the ECU 600 controls switching between the connection state and the disconnection state of the clutch 30 by supplying the clutch control signal SL30 to the clutch 30.

When the clutch 30 is in the disconnected state, the ECU 600 controls the power generation unit 111 so as to generate a reaction force against the steering operation by the driver. More specifically, the ECU 600 controls the power generation unit 111 so that a reaction torque opposite to the steering torque by the driver input via the steering member 410 is transmitted to the steering shaft. As a result, the driver can obtain a feeling of operation for the steering operation.

Although the specific control method of the clutch 30 by the ECU 600 is not limited to this embodiment, for example, the ECU 600 can be configured to switch the clutch 30 to the connected state when some abnormality occurs in the steering device 1A or when the ignition is turned off. With such a configuration, the driver can turn the vehicle wheel 300 without going through an electric path when an abnormality occurs or when the ignition is turned off.

Further, the ECU 600 may be configured to control the power generation unit 111 so that when the clutch 30 is in the connected state, the torque in the same direction as the steering torque by the driver input via the steering member 410 is transmitted to the steering shaft. As a result, the driver can perform the steering operation without requiring a large force even when the clutch 30 is in the connected state.

<Turning Unit 20A>

When the clutch 30 is in the connected state, the pinion gear 206 is rotated by the steering operation via the steering member 410 by the driver, and the rack shaft 208 is displaced in the axial direction.

On the other hand, when the clutch 30 is in the disconnected state, the turning force generation unit 220 generates a turning force according to the turning force control signal SL220 from the ECU 600, and displaces the rack shaft 208 in the axial direction.

Even with such a configuration, by calculating the correction control amount according to the self-aligning torque, the steering control unit 630 according to the present embodiment can eliminate the influence of the self-aligning torque caused by the motion state amount of the vehicle 900, which causes torque loss at the time of turning back. As a result, the steering control unit 630 according to the present embodiment can perform steering control with improved stability of turning back.

[Example of Implementation by Software]

The control block (steering control unit 630) of the ECU 600 may be realized by a logic circuit (hardware) formed in an integrated circuit (IC chip) or the like, or may be realized by software using a central processing unit (CPU).

In the latter case, the ECU 600 includes, a CPU which executes instructions of a program which is software that realizes each function, a read only memory (ROM) or storage device (referred to as a "recording medium") in which the above-described programs and various data are recorded readably by a computer (or CPU), a random access memory (RAM) into which the above-described program is loaded, and the like. Then, the object of the present invention is achieved by the computer (or CPU) reading the above-described program from the recording medium and executing the program. As the recording medium described above, a "non-temporary tangible medium", for example, a tape, a disk, a card, a semiconductor memory, a programmable logic circuit, or the like can be used. Further, the program described above may be supplied to the computer via any transmission medium (communication network, broadcast wave, and the like) capable of transmitting the program. The present invention can also be realized in the form of a data signal embedded in a carrier wave, in which the above-described program is embodied by electronic transmission.

The present invention is not limited to the above-described embodiments, and various modifications can be made within the scope of the claims. Also, the technical scope of the present invention also includes embodiments obtained by appropriately combining the technical means disclosed in the different embodiments.

REFERENCE SIGNS LIST

11: basic control amount calculation unit
12: steering control amount arithmetic unit
13: correction control amount arithmetic unit
14: addition unit
15: slip angle estimation unit
16: SAT arithmetic unit
17: correction control amount calculation unit
630: steering control unit (steering control device)
900: vehicle

What is claimed is:

1. A steering control device which calculates a steering control amount for controlling steering of a vehicle, comprising:
   an electronic control unit (ECU) that includes a central processing unit (CPU) and a storage device, wherein the CPU executes instructions of a program that is loaded in the storage device and performs;
   to calculate a basic control amount,
   to calculate the steering control amount with reference to a self-aligning torque caused by a motion state amount of the vehicle and the basic control amount,
   to calculate a correction control amount with reference to the self-aligning torque,
   to calculate the steering control amount with reference to the basic control amount and the correction control amount,
   to calculate the self-aligning torque with reference to a yaw rate, a roll rate, and a slip angle,
   to calculate the correction control amount using a following equation 1:

$$T'_{sat} = -2\xi K_f \left( \beta + \frac{l_f \gamma}{V} + \frac{h_f \dot{\phi}}{V} \right) \frac{1}{N_s} = T_{assist} \tag{1}$$

$T_{sat}'$: Self-aligning torque
$\xi$: Pneumatic trail
$K_f$: Proportional coefficient determined by tire characteristics
$\beta$: slip angle
$l_f$: Distance from center of gravity of vehicle to wheelbase
$\gamma$: Yaw rate
$V$: Vehicle wheel speed
$h_f$: Distance from roll center to center of gravity of roll
$\phi$ with dots: Roll rate
$N_s$: Steering gear ratio
$T_{assist}$: The correction control amount,
the roll rate is obtained by time-differentiating a roll angle of a tire,
the basic control amount is a steering torque calculated from an actual torque measured by a sensor,
the correction control amount is a corrected self-aligning torque,
the steering control amount is calculated by adding the basic control amount and the correction control amount, and
the CPU transmits the steering control amount to a motor that provides an assist or reaction torque to a steering shaft of the vehicle so as to control steering of the vehicle.

2. The steering control device according to claim 1, wherein
the CPU calculates the slip angle using a lateral speed and a front-rear speed of the vehicle, and calculates the correction control amount with reference to at least the calculated slip angle.

3. The steering control device according to claim 2, wherein
the CPU calculates the lateral speed and the front-rear speed from a vehicle speed, lateral acceleration of the vehicle, and front-rear acceleration of the vehicle.

4. The steering control device according to claim 3, wherein
the CPU uses the roll rate referred to in calculation of a suspension control amount which controls a damping force of the suspension.

5. The steering control device according to claim 2, wherein
the CPU uses the roll rate referred to in calculation of a suspension control amount which controls a damping force of the suspension.

6. A steering device comprising:
the steering control device according to claim 2.

7. A steering device comprising:
the steering control device according to claim 3.

8. The steering control device according to claim 1, wherein
the CPU uses the roll rate referred to in calculation of a suspension control amount which controls a damping force of the suspension.

9. A steering device comprising:
the steering control device according to claim 8.

10. A steering device comprising:
the steering control device according to claim 1.

* * * * *